United States Patent
Ishimoto et al.

[11] Patent Number: 6,101,586
[45] Date of Patent: Aug. 8, 2000

[54] MEMORY ACCESS CONTROL CIRCUIT

[75] Inventors: Junichi Ishimoto; Masanori Tanaka, both of Kanagawa, Japan

[73] Assignee: NEC Corporation, Tokyo, Japan

[21] Appl. No.: 09/024,874

[22] Filed: Feb. 17, 1998

[30] Foreign Application Priority Data

Feb. 14, 1997 [JP] Japan .................................. 9-030385

[51] Int. Cl.⁷ .................................................. G06F 12/00
[52] U.S. Cl. ............................ 711/163; 711/164; 713/200
[58] Field of Search .................................... 711/163, 166, 711/164; 713/200

[56] References Cited

U.S. PATENT DOCUMENTS

| | | | |
|---|---|---|---|
| 4,087,856 | 5/1978 | Attanasio | ................................ 713/200 |
| 4,521,852 | 6/1985 | Guttag . | |
| 4,521,853 | 6/1985 | Guttag . | |
| 4,590,552 | 5/1986 | Guttag et al. . | |
| 4,603,381 | 7/1986 | Guttag . | |
| 4,875,156 | 10/1989 | Tanagawa et al. . | |
| 5,600,818 | 2/1997 | Weikmann | ............................. 711/163 |

FOREIGN PATENT DOCUMENTS

| | | |
|---|---|---|
| 0 661 642 | 7/1995 | European Pat. Off. . |
| 57-81650 | 5/1982 | Japan . |
| 57-83850 | 5/1982 | Japan . |
| 59-11600 | 1/1984 | Japan . |
| 2-148152 | 6/1990 | Japan . |
| 5-265864 | 10/1993 | Japan . |
| 6-96235 | 4/1994 | Japan . |
| 6-202957 | 7/1994 | Japan . |
| 9-114743 | 5/1997 | Japan . |
| 9-160831 | 6/1997 | Japan . |
| WO 93/10498 | 5/1993 | WIPO . |

*Primary Examiner*—Do Hyun Yoo
*Assistant Examiner*—Nasser Moazzami
*Attorney, Agent, or Firm*—Young & Thompson

[57] ABSTRACT

For realizing a memory access control circuit giving a high degree of protection against a fraudulent access, an instruction fetch address register 14 holds the value of a program counter 11, a first area table 15 holds an address of a region to be protected in a memory, and a second area table 16 holds an address of an instruction allowed to access to the region to be protected. An access detecting circuit 17 compares an address of an access destination obtained as the result of an instruction decoding, with the address of the first area table 15, in order to discriminated whether or not the instruction is an instruction accessing to the region to be protected. When it is detected that the instruction is an instruction accessing to the region to be protected, a comparing circuit 18 compares the address of the instruction fetch address register 14 with the address of the second area table 16, in order to discriminated whether or not the instruction is read out from an area allowed to access to the region to be protected. If it is judged that instruction is read out from an area unallowed to access to the region to be protected, the comparing circuit 18 outputs an inhibiting signal, thereby to inhibit a fraudulent access.

6 Claims, 6 Drawing Sheets

MEMORY ACCESS CONTROL CIRCUIT

BACKGROUND OF THE INVENTION

1. Field of the Invention

The present invention relates to a memory access control circuit in a computer system, and more specifically to a memory access control circuit for inhibiting a fraudulent access by detecting an access to a region to be protected on a memory.

2. Description of Related Art

In the prior art, development of a computer program needs a considerable amount of time. A computer program developer covers the development expense by selling the program. However, it is possible that a third person prepares a program for reading a program and data on a memory, and copies the program and data stored in the memory by use of that program. However, if this copying can be easily performed, it becomes difficult to cover the development expense. In addition, in an encryption circuit in which an encryption processing routine and data used in an encryption algorithm are stored in a memory, if these information are read from the memory, a plain text before encryption will be stolen.

Under the above mentioned circumstance, a memory access control circuit for inhibiting the fraudulent access to the memory has been proposed (See for example Japanese Patent Application Pre-examination Publication No. JP-A-59-11600, the content of which is incorporated by reference in its entirety into this application). This JP-A-59-11600 claims Convention Priorities based on four U.S. patent applications, which have now issued as U.S. Pat. Nos. 4,521,852, 4,521,853, 4,590,552 and 4,603,381, the content of which is incorporated by reference in its entirety into this application. FIG. 1 is a block diagram of the prior art memory access control circuit disclosed by JP-A-59-11600.

This prior art memory access control circuit includes a CPU (control processing unit) 31, a nonvolatile memory 32, a temporary memory (RAM) 33, an external interface 34, an address bus 35, a data bus 36, program guard bits 37 indicating the protection situation of information stored in the nonvolatile memory 32, an address logic 38 for discriminating the access to nonvolatile memory 32, an external interface inhibit logic 39 for inhibiting the operation of the external interface 34, an operation inhibiting buffer 40 for inhibiting the operation of the nonvolatile memory 32, an operation inhibiting buffer 41 for inhibiting the operation of the temporary memory 33, and an instruction acquisition logic 42 for determining when the instruction acquisition takes place, which are coupled as shown.

With this arrangement, this memory access control circuit inhibits transfer of information from a region to be protected in the nonvolatile memory 32 or the temporary memory 33 to a region not to be protected. Thus, a third person can no longer read out the data to be protected in the nonvolatile memory 32 to the temporary memory 33 by executing a program on the temporary memory 33.

However, since the prior art memory access control circuit inhibits only the transfer of information from one memory to another, it cannot inhibit to temporarily read out from the data to be protected in the memory to a general purpose register such as an accumulator in the CPU, and to perform any arithmetic operation for the read-out data and to output the result of the arithmetic operation into a region not to be protected in the memory. In this case, the original data to be protected can be known by obtaining the result of arithmetic operation.

For example, after the data in the region to be protected is read out to the accumulator and a simple arithmetic operation for adding "0" into the read-out data is executed, if the result of arithmetic operation is read out, the original data to be protected can be easily known. Alternatively, by investigating the change of the status in a status flag (for example, a carry flag) internally provided in the CPU when an arithmetic operation is executed, the original data to be protected can be indirectly known.

SUMMARY OF THE INVENTION

Accordingly, it is an object of the present invention to provide a memory access control circuit which has overcome the above mentioned defect of the conventional one.

Another object of the present invention is to provide a memory access control circuit having a high degree of protection against a fraudulent access.

The above and other objects of the present invention are achieved in accordance with the present invention by a memory access control circuit for inhibiting a fraudulent access by detecting an access to a region to be protected on a memory, the memory access control circuit comprising:

a first address holding means for holding an instruction fetch address indicating a memory location where an instruction to be executed is stored;

a second address holding means for holding an address for the region to be protected;

a third address holding means for holding an instruction fetch address indicating a memory location of an instruction allowed to access to the region to be protected;

an access detecting means for comparing an address of an access destination of an instruction read out from the memory, obtained from the result of a decoding of the read-out instruction, with the address held in the second address holding means, for discriminating whether or not the read-out instruction is an instruction accessing to the region to be protected;

a comparing means for comparing the instruction fetch address held in the first address holding means with the instruction fetch address held in the third address holding means when the access detecting means detects that the read-out instruction is the instruction accessing to the region to be protected, the comparing means outputting an inhibiting signal when the read-out instruction is an instruction read out from a memory address unallowed to access to the region to be protected; and an access inhibiting means responding to the inhibiting signal to inhibit a memory access.

In the memory access control circuit in accordance with the first aspect of the present invention, the access detecting means discriminates whether or not the instruction is an instruction accessing to the region to be protected. When it is detected that the instruction is the instruction accessing to the region to be protected, the comparing means discriminates whether or not the instruction is an instruction read out from a memory address allowed to access to the region to be protected. When it is judged that the instruction is an instruction read out from a memory address unallowed to access to the region to be protected, it is deemed that the instruction is a fraudulent access, and the inhibiting signal is outputted so that the memory access is inhibited by the inhibiting means. Thus, it is possible to inhibit the fraudulent access to the region to be protected.

According to another aspect of the present invention, there is provided a memory access control circuit for inhibiting a fraudulent access by detecting an access to a region to be protected on a memory, the memory access control circuit comprising:

a first address holding means for holding an instruction fetch address indicating a memory location where an instruction to be executed is stored;

a second address holding means for holding an address for the region to be protected;

a third address holding means for holding an instruction fetch address indicating a memory location of an instruction allowed to branch to the region to be protected;

an access detecting means for comparing an address of a branch destination of an instruction read out from the memory, obtained from the result of a decoding of the read-out instruction, with the address held in the second address holding means, for discriminating whether or not the read-out instruction is an instruction branching to the region to be protected;

a comparing means for comparing the instruction fetch address held in the first address holding means with the instruction fetch address held in the third address holding means when the access detecting means detects that the read-out instruction is the instruction branching to the region to be protected, the comparing means outputting an inhibiting signal when the read-out instruction is an instruction read out from a memory address unallowed to branch to the region to be protected; and an access inhibiting means responding to the inhibiting signal to inhibit execution of the branch instruction.

In the memory access control circuit in accordance with the second aspect of the present invention, the access detecting means discriminates whether or not the instruction is an instruction branching to the region to be protected. When it is detected that the instruction is the instruction branching to the region to be protected, the comparing means discriminates whether or not the instruction is an instruction read out from a memory address allowed to branch to the region to be protected. When it is judged that the instruction is an instruction read out from a memory address unallowed to branch to the region to be protected, it is deemed that the instruction is a fraudulent instruction, and the inhibiting signal is outputted so that the execution of the branch instruction is inhibited by the inhibiting means. Thus, it is possible to inhibit the fraudulent branch to the region to be protected.

The above and other objects, features and advantages of the present invention will be apparent from the following description of preferred embodiments of the invention with reference to the accompanying drawings.

DESCRIPTION OF THE PREFERRED EMBODIMENTS

First Embodiment

Figure 1:
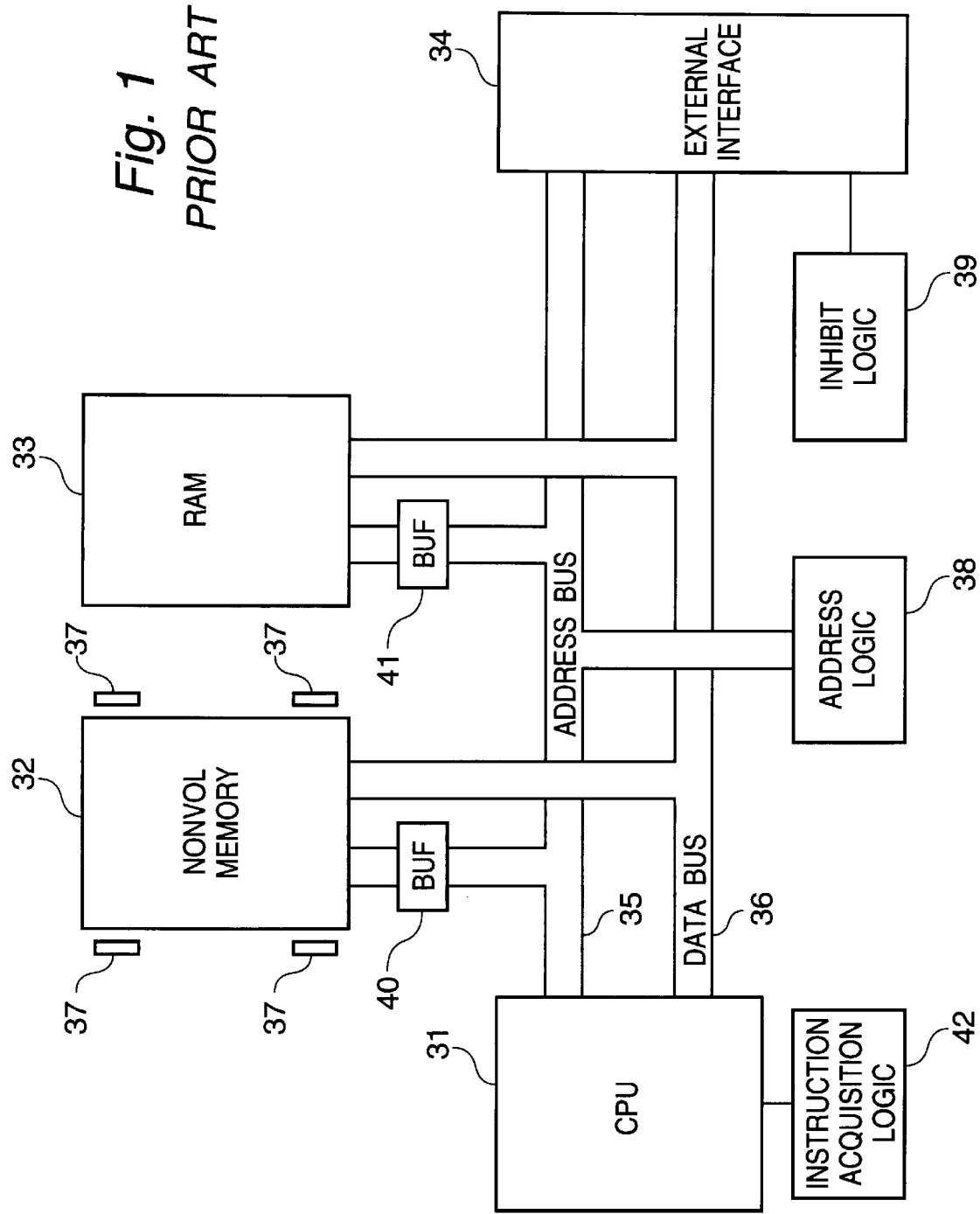
FIG. 1 is a block diagram of the prior art memory access control circuit.
Figure 2:
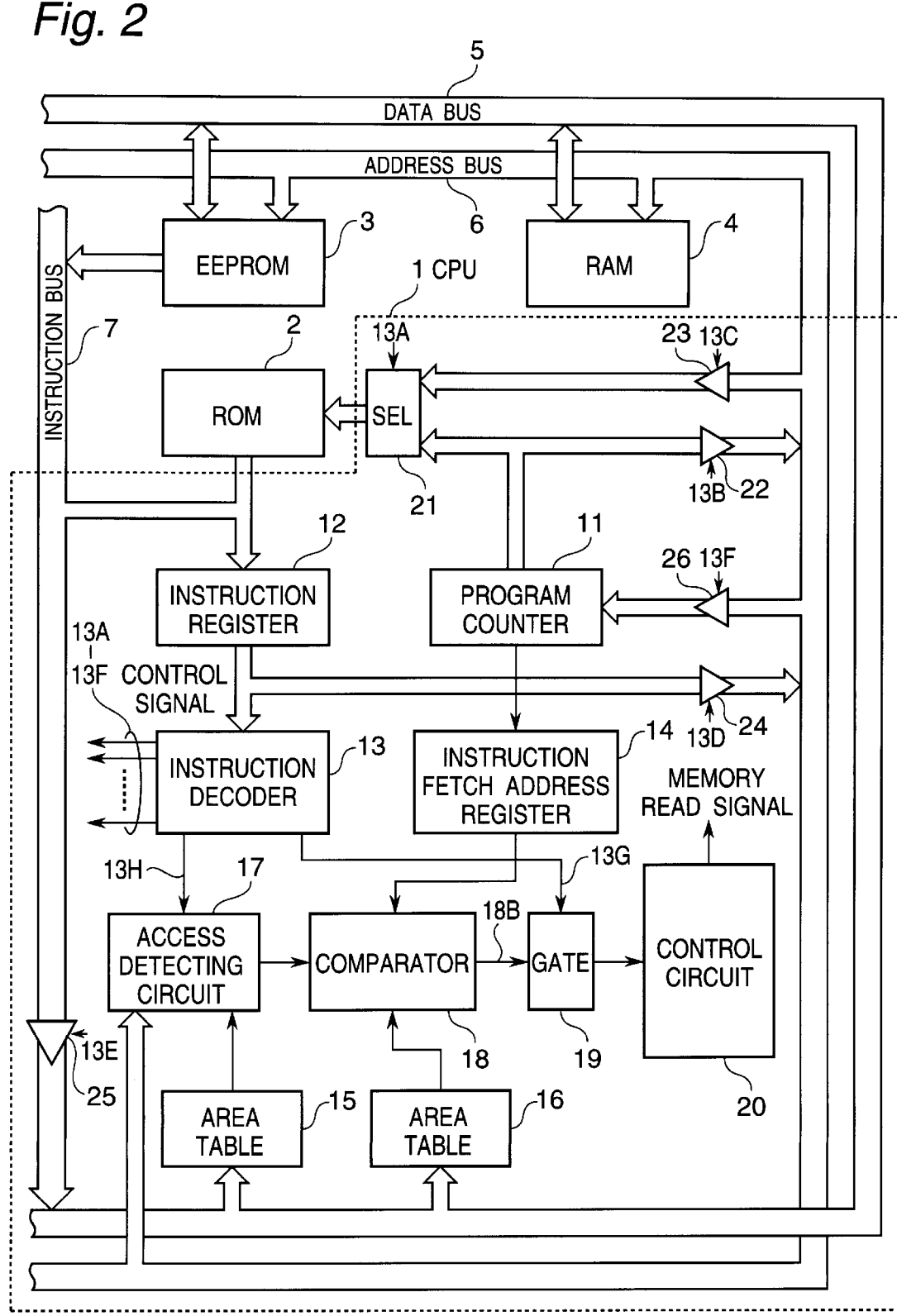
FIG. 2 is a block diagram of a first embodiment of the memory access control circuit in accordance with the present invention.

Referring to FIG. 2, there is shown a block diagram of a first embodiment of the memory access control circuit in accordance with the present invention.

The shown embodiment of the memory access control circuit includes a CPU (central processing unit) 1, a mask ROM (read only memory) 2 in which information is written at a manufacturing time but can no longer rewritten after the manufacturing time, an EEPROM (electrically erasable and programmable ROM) 3 in which a writing and a reading can be performed electrically, a RAM (random access memory) 4, a data bus 5 for transferring data, an address bus 6 for transferring an address, and an instruction bus 7, which are coupled as shown. In brief, the CPU 1 and the EEPROM 3 are coupled to the data bus 5, the address bus 6 and the instruction bus 7, the ROM 2 is coupled to the instruction bus 7 and also coupled to the CPU 1 to directly receive an address from the CPU 1, and the RAM 4 is coupled to the data bus 5 and the address bus 6.

The CPU 1 includes, in addition to an arithmetic and logic unit and a general purpose register such as an accumulator (which are not shown since they are not directly related to the gist of the invention), a program counter 11 for indicating an address in the memory where an instruction to be executed is stored, an instruction register 12 for holding an instruction word read out from the memory, an instruction decoder 13 for decoding the instruction word held in the instruction register 12, an instruction fetch address register 14 (acting as a first address holding means) for holding an instruction fetch address which is an output of the program counter 11, an area table 15 (acting as a second address holding means) for holding an address of a region to be protected in the memory, another area table 16 (acting as a third address holding means) for holding an instruction fetch address indicating a memory location of an instruction allowed to access to the region to be protected, an access detecting circuit 17 for discriminating whether or not the decoded instruction is an instruction accessing to the region to be protected, on the basis of the decoded result of instruction from the instruction decoder 13 and on the basis of the result of comparison between an address of an access destination indicated by the decoded instruction and the address held in the area table 15, a comparator 18 for comparing the instruction fetch addresses held in the register 14 with the instruction fetch addresses held in the table 15 when the access detecting circuit 17 detects the instruction accessing to the region to be protected, the comparing circuit 18 outputting an inhibit signal when the instruction is an instruction read out from a memory address allowed to access the region to be protected, a gate circuit 19 for inhibiting a transfer of a signal from the decoder 13 to a control circuit 20 when the inhibit signal is outputted, a selector 21 and buffers 22 to 26, which are coupled as shown. The selector 21 and the buffers 22 to 26 are controlled by control signals 13A to 13F generated by the instruction decoder 13, respectively.

Here, the instruction decoder 13, the gate circuit 19 and the control circuit 20 constitute an inhibiting means.

In the memory access control circuit of this embodiment, the mask ROM 2 and the EEPROM 3 includes a program area for storing instructions to be executed, and a data area for storing data. The memory access control circuit is configured to protect data (for example, encryption key used in the encryption algorithm) written in the region to be protected in the mask ROM 2 or the EEPROM 3.

Now, the operation of the above mentioned memory access control circuit will be described with reference to FIG. 3, which is a timing chart illustrating the operation of the memory access control circuit shown in FIG. 2.

A computer system including this memory access control circuit sequentially reads, decodes and executes instruction words from the ROM 2 or the EEPROM 3 in accordance with the instruction fetch address outputted from the program counter 11.

At the time for fetching the instruction from the ROM 2 or the EEPROM 3, the selector 21 and the buffer 22 are controlled by the control signals 13A and 13B from the instruction decoder 13, respectively, so that the selector 21 selects the output of the program counter 11 and the buffer 22 is put into an enable condition. Therefore, the instruction fetch address outputted from the program counter 11 is supplied through the selector 21 to the mask ROM 2 and also through the buffer 22 and the address bus 6 to the EEPROM 3.

If this instruction fetch address is an address allocated to the mask ROM 2, an instruction word is read out from a corresponding address of the ROM 2 to the instruction bus 7, and if the instruction fetch address is an address allocated to the EEPROM 3, an instruction word is read out from a corresponding address of the EEPROM 3 to the instruction bus 7. The instruction word outputted onto the instruction bus 7 is stored in the instruction register 12.

By the way, the instruction word includes an instruction code designating an operation to be executed, and an operand code designating data subjected to the operation.

Here, assume that an instruction word accessing to the ROM 2 or the EEPROM 3 (called a "data reading instruction" hereinafter) is of the instruction format of two bytes-two states (the instruction code of one byte and the operand code of one byte). As shown in "B" of FIG. 3, in a final state of a preceding instruction, the instruction fetch address becomes an address "AD" indicating a memory location where an instruction code of the data reading instruction is stored, and in a next state, it becomes an address "AD+1" indicating a memory location where an operand code of the same instruction is stored.

Figure 3:
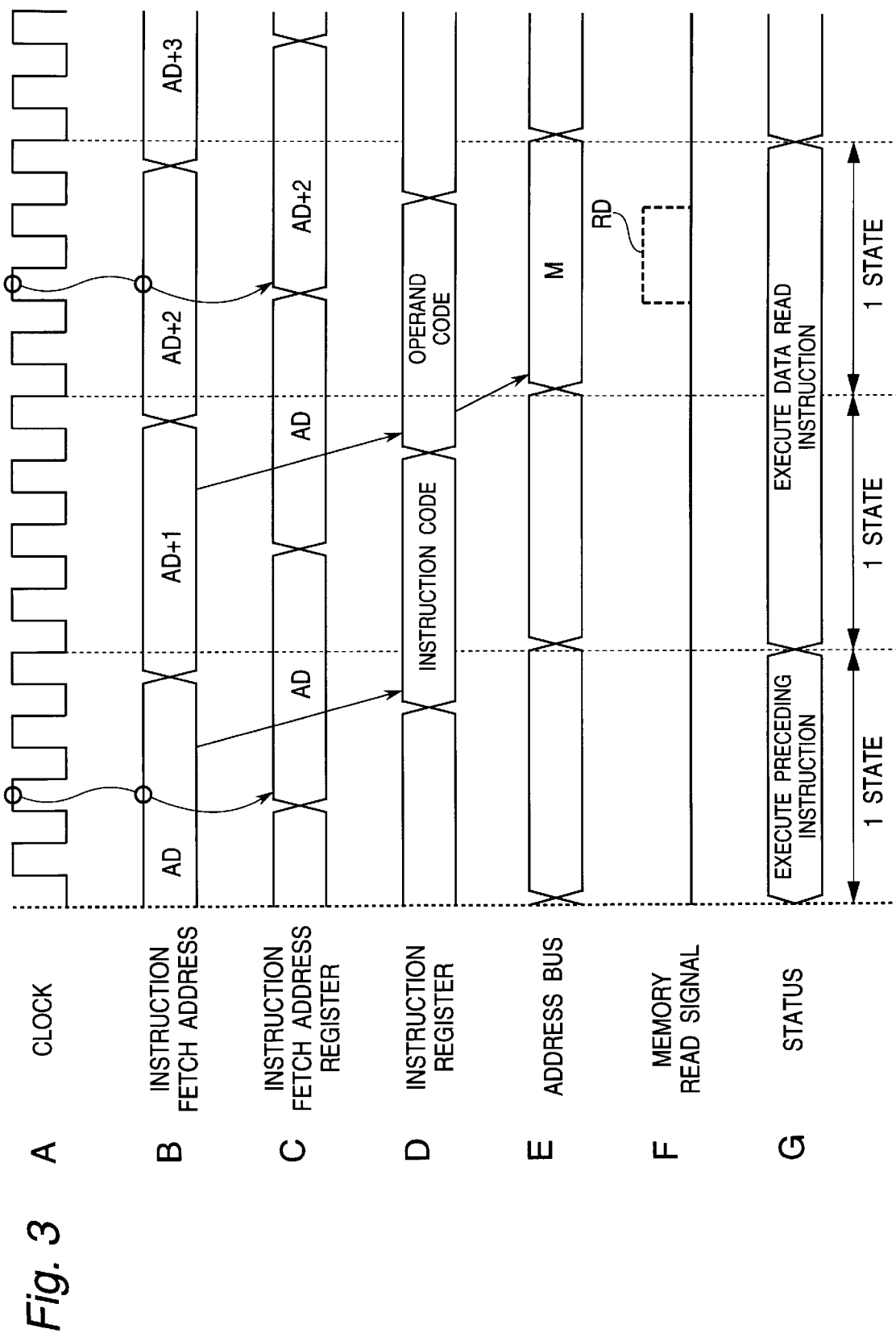
FIG. 3 is a timing chart illustrating the operation of the memory access control circuit shown in FIG. 2.

Accordingly, as shown in "D" of FIG. 3, in the final state of the preceding instruction, the instruction code is stored in the instruction register 12, and in the next state, the operand code is stored in the instruction register 12.

On the other hand, as shown in "C" of FIG. 3, of the instruction fetch address outputted from the program counter 11, the address "AD" for the instruction code is stored in the instruction fetch address register 14. This instruction fetch address register 14 continues to hold its content until the content is updated by a next instruction fetch.

Succeedingly, the instruction decoder 13 decodes the instruction code stored in the instruction register 12, in a first state of this instruction cycle. If the decoded instruction is the data reading instruction, the instruction decoder 13 controls the selector 21 and the buffers 23 to 25 by the control signals 13A and 13C to 13E, so as to bring the buffers 23 to 25 into an enable condition and to cause the selector 21 to select an output of the buffer 23.

Thus, the operand code stored in the instruction register 12 next to the instruction code is outputted through the buffer 24 to the address bus 6 as an address "M" of the data access destination, so that it is supplied through the buffer 23 and the selector 21 to the ROM 2 and through the address bus 6 to the EEPROM 3.

In addition, if the decoded result of the instruction code indicates that the instruction is the data reading instruction, the instruction decoder 13 outputs a control signal 13G indicating that the instruction is the data reading instruction. This control signal 13G is supplied through the gate circuit 19 to the control circuit 20. An operation of this gate circuit will be described hereinafter.

Thus, the control circuit 20 outputs a memory read signal.

When the memory read signal is outputted, if the address given to the mask ROM 2 is the address allocated to the ROM 2, data at the corresponding address in the ROM 2 is outputted through the buffer 25 to the data bus 5. If the address is the address allocated to the EEPROM 3, data at the corresponding address in the EEPROM 3 is outputted through the buffer 25 to the data bus 5. The data thus outputted to the data bus 5 is stored in the general purpose register (not shown) such as the accumulator in the CPU 1.

Thus, fetching and execution of the data reading instruction have been completed.

In the above mentioned instruction fetching and instruction execution, if the instruction read out from the memory is an instruction accessing the region to be protected, from which of the memory areas the instruction concerned is read out is discriminated, and if the instruction concerned is an instruction read out from an area allowed to access to the region to be protected, the execution of the instruction is continued as an ordinary case. If the instruction concerned is an instruction read out from an area unallowed to access to the region to be protected, the memory access operation is inhibited. Now, this operation will be described.

First, the address of the region to be protected in the mask ROM 2 or the EEPROM 3 is stored in the area table 15, and the instruction fetch address of an instruction allowed to access the region to be protected is stored in the area table 16.

In order to set these information, it is sufficient if a program for writing the address information into the area tables 15 and 16 is stored in the mask ROM 2 or the EEPROM 3 and if the address information is written into the area tables 15 and 16 when the computer system is started. Alternatively, it is also sufficient if the area tables 15 and 16 are constituted of a ROM and can be written with the address information when the program is prepared.

When the instruction decoder 13 discriminates that the instruction is the memory access instruction, in response to a control signal 13H the access detecting circuit 17 compares the address held in the area table 15 with the address outputted on the address bus 6 (the address of the data access destination obtained from the operand code), in order to discriminate whether or not the access instruction is an access to the region to be protected.

Here, since the address registered in the area table 15 is an address for the region to be protected, a specific address range, for example, from the address "8000h" to the address "8FFFh" (where the suffix "h" means a hexadecimal notation) is registered in the area table 15.

Accordingly, if an address coincident with the address outputted on the address bus 6 is included in the address range registered in the area table 15, the access detecting circuit 17 discriminates that the instruction is an instruction accessing the region to be protected. If the address range registered in the area table 15 includes none coincident with the address outputted on the address bus 6, it is discriminated that the instruction is not an instruction accessing the region to be protected.

In addition, since it is sufficient if there is investigated whether or not the address concerned is included in the address range registered in the area table 15, it is not necessary to compare all bits of the address. For example, if the address range registered in the area table 15 is from the address the address "8000h" to the address "8FFFh", since four significant bits of the 16-bit address information is "1000", it is sufficient to compare only the four significant bits of the 16-bit address information.

When the access detecting circuit 17 discriminates that the instruction is the instruction accessing the region to be protected, the comparing circuit 18 compares the instruction fetch address held in the instruction fetch address register 14 with the instruction fetch address held in the area table 16, in order to investigate whether or not the instruction is one read out from the area allowed to access the region to be protected.

At this time, since a specific address range is registered in the area table 16, the comparator 18 discriminates that the instruction is one read out from the area allowed to access the region to be protected, if the instruction fetch addresses registered in the area table 16 include one coincident with the instruction fetch address registered in the instruction fetch address register 14. If no coincidence can be obtained, the comparator 18 discriminates that the instruction is not one read out from the area therefore not allowed to access the region to be protected.

When the comparator 18 discriminates that the instruction is one read out from the area not allowed to access the region to be protected, the comparator 18 outputs an inhibit signal 18B to the gate circuit 19.

When the comparator 18 outputs the inhibit signal 18B, the gate circuit 19 inhibits transfer of the control signal 13G outputted from the instruction decoder 13 to the control circuit 20. As a result, since the control signal 13G indicating that the instruction is the data reading instruction is not supplied to the control circuit 20, the control circuit 20 does not output a memory read signal "RD" as shown in dotted line in "F" of FIG. 3.

Thus, by previously setting the address information in the area tables 15 and 16, if the instruction does not access the region to be protected, and even if the instruction accesses the region to be protected, if the instruction is read out from the area allowed to access the region to be protected, the memory access is normally executed. However, if the instruction accessing the region to be protected is read out from the area not allowed to access the region to be protected, the memory access is judged to be a fraudulent instruction program, and therefore, the memory access is inhibited.

Accordingly, even if a third person writes a fraudulent instruction program on the EEPROM 3 and attempts to fraudulently read out the data from the region to be protected in the mask ROM 2 or the EEPROM 3, it is not possible to read out the data, nor can it execute an arithmetic operation to the data in the region to be protected.

Incidentally, in the above mentioned embodiment, the data reading instruction has been described, but other memory access instructions can be similarly considered. For example, if a data writing instruction for writing data into the EEPROM 3 is considered in place of the data reading instruction, the address of the data access destination in the above description is replaced by a writing address in the memory, and the memory read signal is replaced by a memory write signal.

Second Embodiment

Figure 4:
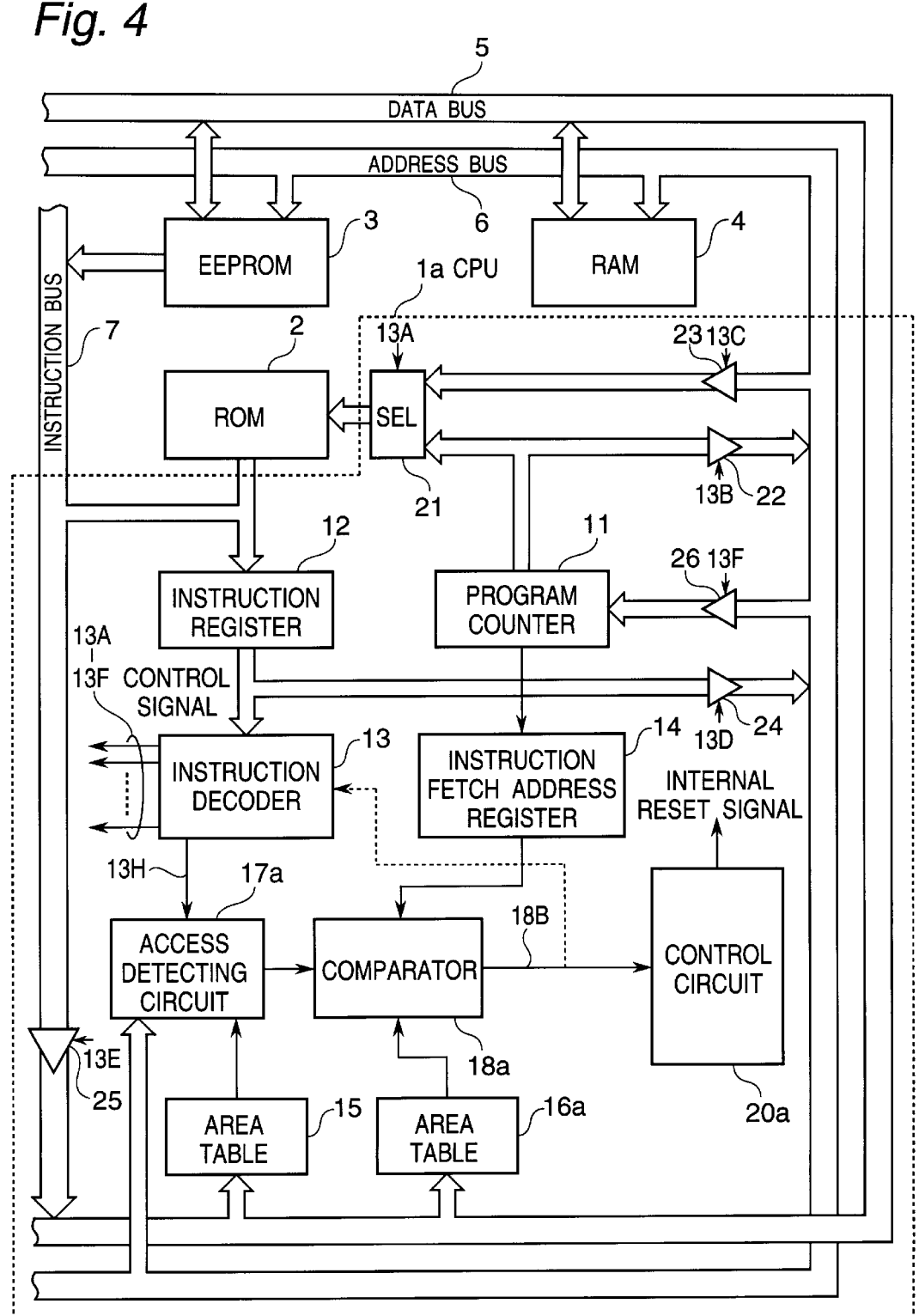
FIG. 4 is a block diagram of a second embodiment of the memory access control circuit in accordance with the present invention.

Referring to FIG. 4, there is shown a block diagram of a second embodiment of the memory access control circuit in accordance with the present invention. In FIG. 4, elements corresponding to those shown in FIG. 2 are given the same Reference Numerals, and elements similar to those shown in FIG. 2 are given the same Reference Numerals suffixed with "a", and explanation thereof will be omitted for simplification of description.

The second embodiment of the memory access control circuit is configured to protect a processing content in a processing routine, when an instruction processing routine such as the encryption processing routine, which must be kept secret from a third person, is written in the mask ROM 2 or in the EEPROM 3.

Figure 5:
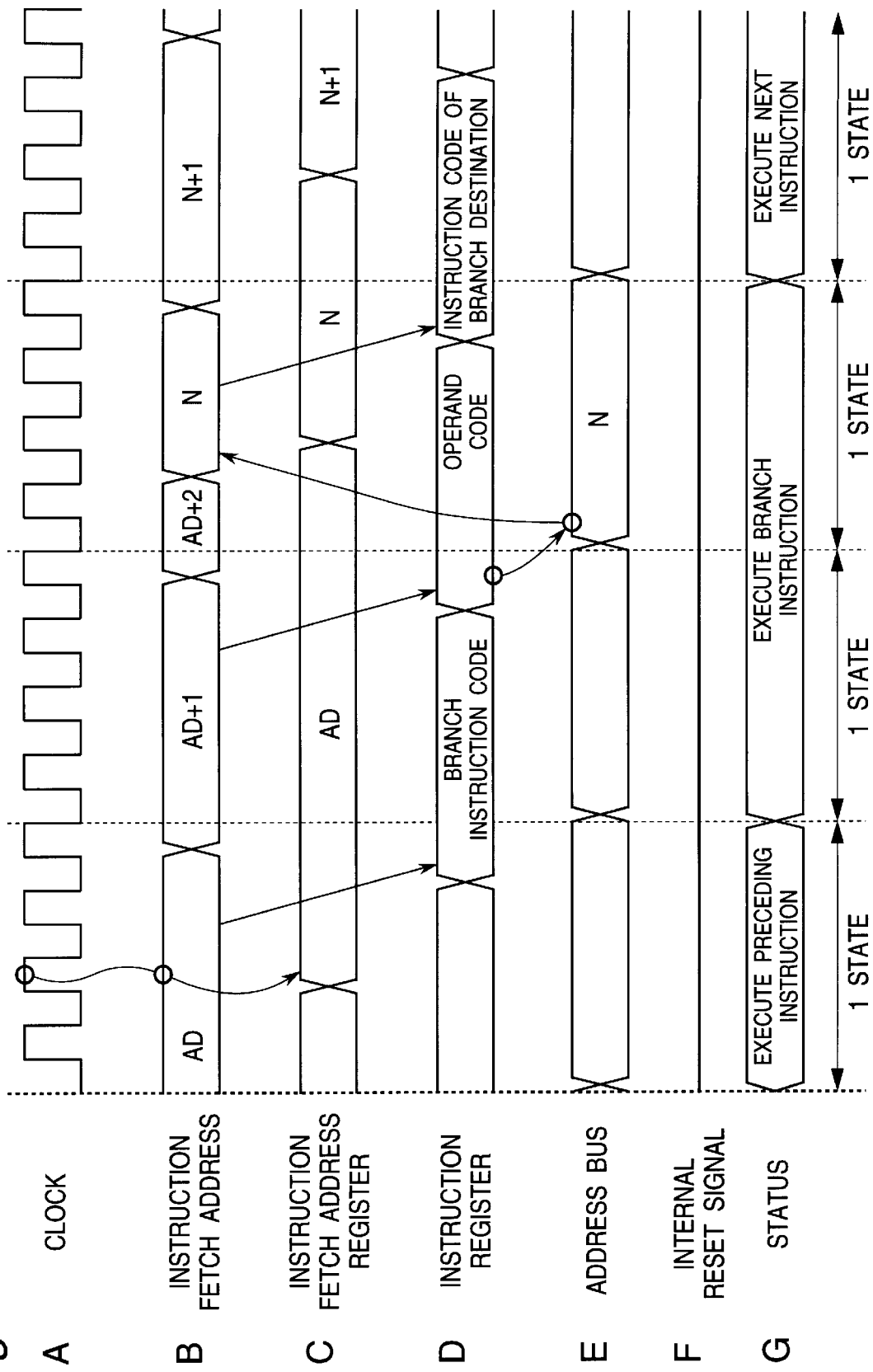
FIG. 5 is a timing chart illustrating the operation of the memory access control circuit shown in FIG. 4.
Figure 6:
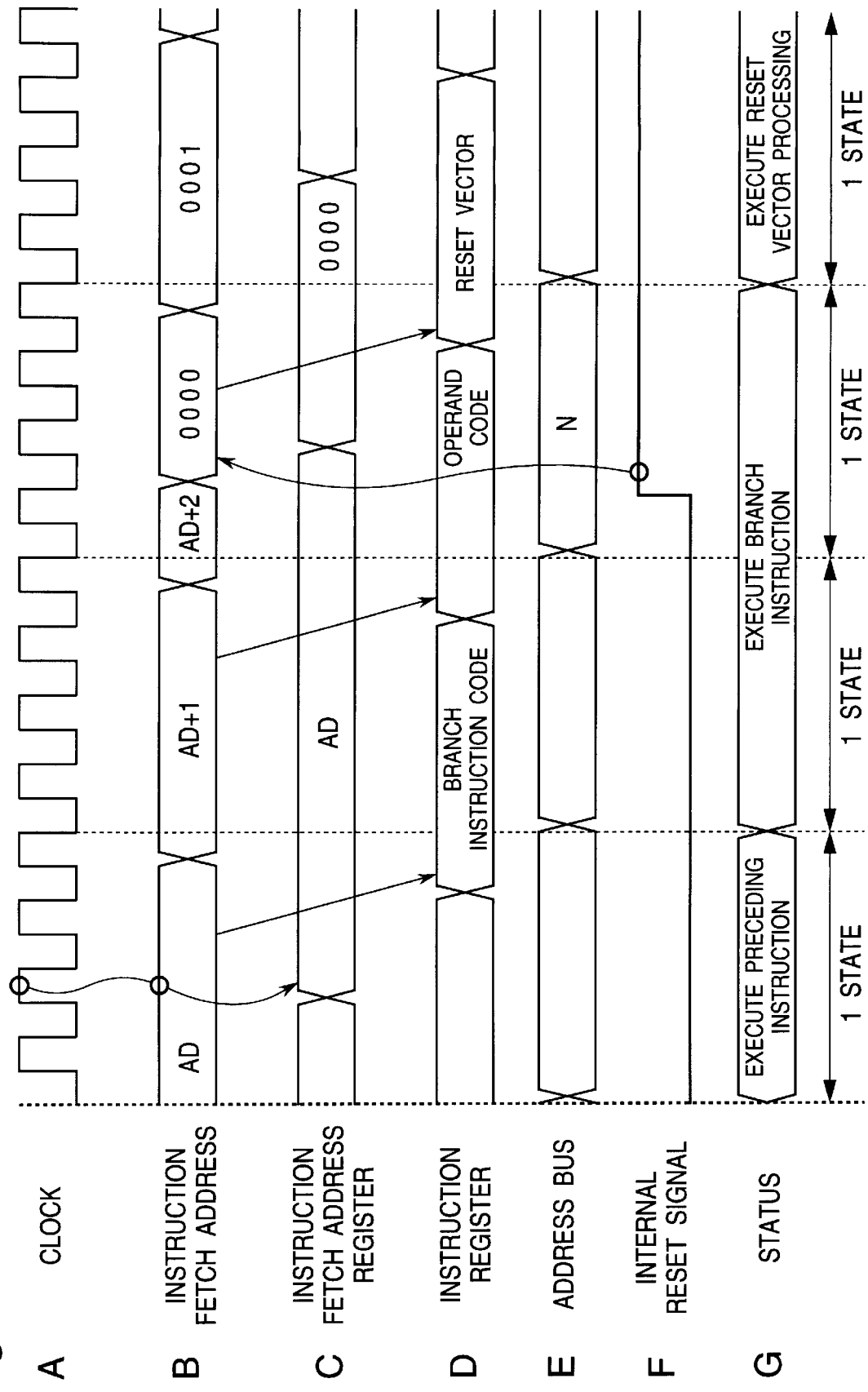
FIG. 6 is a timing chart illustrating the operation of the memory access control circuit shown in FIG. 4.

Now, the operation of the second embodiment of the memory access control circuit will be described with reference to FIGS. 5 and 6 which are a timing chart illustrating the operation of the memory access control circuit shown in FIG. 4. FIG. 5 is a timing chart illustrating the operation when a branch instruction is an instruction read out from an area allowed to branch into the region to be protected, and FIG. 6 is a timing chart illustrating the operation when a branch instruction is an instruction read out from an area unallowed to branch into the region to be protected.

At the time for fetching the instruction from the ROM 2 or the EEPROM 3, the instruction fetch address outputted from the program counter 11 is supplied through the selector 21 to the mask ROM 2 and also through the buffer 22 and the address bus 6 to the EEPROM 3, similarly to the first embodiment.

If this instruction fetch address is an address allocated to the mask ROM 2, an instruction word is read out from a corresponding address of the ROM 2 to the instruction bus 7, and if the instruction fetch address is an address allocated to the EEPROM 3, an instruction word is read out from a corresponding address of the EEPROM 3 to the instruction bus 7. The instruction word outputted onto the instruction bus 7 is stored in the instruction register 12.

Assuming that an instruction branching into a subroutine is of the instruction format of two bytes-two states (the instruction code of one byte and the operand code of one byte), as shown in "B" of FIG. 5, in a final state of a preceding instruction, the instruction fetch address becomes an address "AD" indicating a memory location where an instruction code of the branch instruction is stored, and in a next state, it becomes an address "AD+1" indicating a memory location where an operand code of the same instruction is stored.

Accordingly, as shown in "D" of FIG. 5, in the final state of the preceding instruction, the instruction code is stored in the instruction register 12, and in the next state the operand code is stored in the instruction register 12.

On the other hand, as shown in "C" of FIG. 5, of the instruction fetch address outputted from the program counter 11, the address "AD" for the instruction code is stored in the instruction fetch address register 14.

Succeedingly, the instruction decoder 13 decodes the instruction code stored in the instruction register 12, in a first state of this instruction cycle. If the decoded instruction is the branch instruction, the instruction decoder 13 controls the selector 21 and the buffers 22, 24 and 26 by the control signals 13A, 13B, 13D and 13F, so as to bring the buffers 22, 24 and 26 into an enable condition and to cause the selector 21 to select an output of the program counter 11.

Thus, the operand code stored in the instruction register 12 next to the instruction code is outputted through the buffer 24 to the address bus 6 as an address "N" of the branch destination, as shown in "E" of FIG. 5, and is also stored in the program counter 11 through the buffer 26. Thus, the instruction fetch address outputted from the program counter 11 becomes the address "N" as shown in "B" of FIG. 5. In addition, this instruction fetch address is supplied through the selector 21 to the mask ROM 2 and through the buffer 22 and the address bus 6 to the EEPROM 3.

If the instruction fetch address is the address allocated to the ROM 2, data at the corresponding address in the ROM 2 is outputted to the instruction bus 7. If the instruction fetch address is the address allocated to the EEPROM 3, data at the corresponding address in the EEPROM 3 is outputted to the instruction bus 7. The data thus outputted to the instruction bus 7 is stored in the instruction register 12, as shown in "D" of FIG. 5.

Thus, the branch processing has been completed.

The instruction fetch address outputted from the program counter 11 is ordinarily incremented for updating, with each instruction fetching and instruction execution. However, if the branch instruction is read out from the memory as mentioned above, the content of the program counter is updated to the branch destination address, so that the address branching is performed in the program execution.

In the above mentioned branch instruction fetching and execution, if the instruction read out from the memory is an instruction branching to the region to be protected, from which of the memory areas the instruction concerned is read out is discriminated, and if the instruction concerned is an instruction read out from an area allowed to branch to the region to be protected, the branch instruction is executed as an ordinary case. If the instruction concerned is an instruction read out from an area unallowed to branch to the region to be protected, the execution of the branch instruction is inhibited. Now, this operation will be described.

First, the address of the region to be protected in the mask ROM 2 or the EEPROM 3 is stored in the area table 15, and the instruction fetch address of a branch instruction allowed to branch to the region to be protected is stored in the area table 16a. The manner for setting these information can be similar to that in the first embodiment.

When the instruction decoder 13 discriminates that the instruction is the branch instruction, in response to the control signal 13H an access detecting circuit 17a compares the address held in the area table 15 with the address outputted on the address bus 6 (the address of the branch destination obtained from the operand code), in order to discriminate whether or not the branch instruction is an instruction branching to the region to be protected.

Accordingly, if the address range registered in the area table 15 includes an address coincident with the address outputted on the address bus 6, the access detecting circuit 17a discriminates that the instruction is the instruction branching to the region to be protected. If the address outputted on the address bus 6 is coincident with none included in the address range registered in the area table 15, it is discriminated that the instruction is not the instruction branching to the region to be protected.

When the access detecting circuit 17a discriminates that the instruction is the instruction branching to the region to be protected, a comparator 18a compares the instruction fetch address held in the instruction fetch address register 14 with the instruction fetch address held in the area table 16a, in order to investigate whether or not the instruction is one read out from the area allowed to branch to the region to be protected.

Namely, the comparator 18a discriminates that the instruction is one read out from the area allowed to branch to the region to be protected, if the instruction fetch addresses registered in the area table 16a include one coincident with the instruction fetch address registered in the instruction fetch address register 14. If no coincidence can be obtained, the comparator 18a discriminates that the instruction is one read out from the area not allowed to branch to the region to be protected.

When the comparator 18a discriminates that the instruction is one read out from the area not allowed to branch to the region to be protected, the comparator 18a outputs an inhibit signal 18B.

When the comparator 18a outputs the inhibit signal 18B, a control circuit 20a generates an internal reset signal as shown in "F" of FIG. 6, which resets a CPU as if a reset signal is given from an external of a CPU 1a. Simultaneously, this internal reset signal is supplied to a peripheral circuit of the CPU 1a so that the peripheral circuit is similarly reset.

If the internal reset signal is outputted, the program counter 11 is cleared to "0" (zero), so that the instruction fetch address becomes "0000h" as shown in "B" of FIG. 6. As a result, after the status of the branch instruction, a reset vector processing routine is executed, as shown in "G" of FIG. 6.

Accordingly, if the subroutine (subprogram) is written in the mask ROM 2 or the EEPROM 3, it is considered that a third person attempting to read out the subroutine writes into the memory an instruction program for calling the subroutine. Ordinarily, the address where the subroutine is written cannot be known to the third person. However, it is possible to estimate the address of the subroutine by externally monitoring the operation of the peripheral device and the data on the data bus 5 and on the address bus 6. In this case, there is a fear that, by giving a large amount of analyzing data to the subroutine and analyzing the processing on the basis of a large amount of result obtained, the content of the processing executed by the subroutine is deciphered.

In this embodiment, however, by previously setting the address information in the area tables 15 and 16a, if the instruction does not branch the region to be protected, and even if the instruction branches the region to be protected, if the instruction is read out from the area allowed to branch to the region to be protected, the branching is normally executed. However, if the instruction branching to the region to be protected is read out from the area not allowed to branch to the region to be protected, the branching is judged to be a fraudulent instruction program, and therefore, the processing is reset.

Accordingly, even if a third person writes a fraudulent instruction program on the EEPROM 3, it is not possible to call for the subroutine in the region to be protected in the mask ROM 2 or in the EEPROM 3, nor can it give the analyzing data to the subroutine.

In this embodiment, the control circuit 20a constitutes the inhibiting means. However, the instruction decoder 13 can be used as the inhibiting means, by supplying the instruction decoder 13 with the inhibiting signal 18B outputted from the comparator circuit 18a, as shown by a dotted line in FIG. 4. In this case, when the instruction decoder 13 fetches the branch instruction, the instruction decoder 13 ordinarily controls to update the value of the program counter 11 to the address of the branch destination, but if the instruction decoder 13 receives the inhibiting signal from the comparator 18a, the instruction decoder 13 masks the control signal for updating the address. Accordingly, when the inhibiting signal is outputted, the instruction fetch address outputted from the program counter 11 is not updated to the address of the branch destination, and is incremented by +1 as an ordinary non-branching case. This is equivalent to execution of an NOP (no operation) instruction. Accordingly, an effect similar to the above mentioned effect can be obtained.

Furthermore, it can be also constructed that, when the inhibiting signal is outputted, the control circuit 20a requests an interrupt processing similar to that when an interrupt request signal is supplied from an external of the CPU 1a. In this case, a non-maskable interrupt is forcibly started, so that there is executed any processing in an interrupt processing routine (for example, to indicate a fraudulent access on a display).

In addition, the protection function can be raised by inhibiting the execution of a branch instruction, excepting that a branch instruction is executed after a plurality of instructions are executed in a predetermined order of instruction fetch addresses. For this purpose, the instruction fetch address register 14 is modified to hold instruction fetch addresses for a plurality of instruction codes, and the area table 16a is modified to set not only the instruction fetch address of the branch instruction allowed to branch to the region to be protected, but also instruction fetch addresses for a plurality of instructions to be executed before the allowed branch instruction. The comparator 18a compares the contents of the register 14 with the contents of the tables 16a.

In the above mentioned first and second embodiments, the memory construction includes the mask ROM 2, the EEPROM 3 and the RAM 4. However, the present invention is not limited to this memory construction. In addition, the bus construction includes the data bus 5, the address bus 6 and the instruction bus 7, but the instruction bus 7 can be omitted by modifying to the effect that data and instructions are transferred through the data bus in a time-division manner. Furthermore, the RAM 4 can include the region to be protected, and it can be so constructed that an instruction is fetched from the RAM.

As mentioned above, according to the first aspect of the present invention, the access detecting means discriminates whether or not the instruction is an instruction accessing the region to be protected. When it is detected that the instruction is the instruction accessing the region to be protected, the comparing means discriminates whether or not the instruction is an instruction read out from a memory address allowed to access to the region to be protected. When it is judged that the instruction is an instruction read out from a memory address not allowed to access to the region to be protected, it is deemed that the instruction is a fraudulent access, and the inhibiting signal is outputted so that the memory access is inhibited by the inhibiting means. Thus, the fraudulent access to the region to be protected is inhibited, with the result that the data stored in the region to be protected can be protected. Namely, a high level of protection can be achieved. Accordingly, since whether or not the access is a fraudulent access is discriminated for all instructions accessing to the memory, including an instruction for transferring data from one memory to another, it is no longer possible to perform any arithmetic operation for the data in the region to be protected for the purpose of indirectly knowing the content of the data in the region to be protected, in place of directly reading out the data in the region to be protected.

Furthermore, according to the second aspect of the present invention, the access detecting means discriminates whether or not the instruction is an instruction branching to the region to be protected. When it is detected that the instruction is the instruction branching to the region to be protected, the comparing means discriminates whether or not the instruction is an instruction read out from a memory address allowed to branch to the region to be protected. When it is judged that the instruction is an instruction read out from a memory address not allowed to branch to the region to be protected, it is deemed that the instruction is a fraudulent instruction, and the inhibiting signal is outputted so that the execution of the branch instruction is inhibited by the inhibiting means. Thus, the fraudulent branch to the region to be protected is inhibited, with the result that the subprogram stored in the region to be protected can be protected. Accordingly, it is possible to prevent the instruction program in the region to be protected, from being unnecessarily executed by a fraudulent access from an external, with the result that it is possible to prevent a fraudulent access by a third person for deciphering the instruction program.

The invention has thus been shown and described with reference to the specific embodiments. However, it should be noted that the present invention is in no way limited to the details of the illustrated structures but changes and modifications may be made within the scope of the appended claims.

What is claimed is:

1. A memory access control circuit for inhibiting a fraudulent access by detecting an access to a region to be protected on a memory, the memory access control circuit comprising:

a first address holding means for holding an instruction fetch address indicating a memory location where an instruction to be executed is stored;

a second address holding means for holding an address for said region to be protected;

a third address holding means for holding an instruction fetch address comprising a memory location of an instruction allowed to access to said region to be protected;

an access detecting means for comparing an address of an access destination of an instruction read out from the memory, obtained from the result of a decoding of said read-out instruction, with said address held in said second address holding means, for discriminating whether or not said read-out instruction is an instruction accessing to said region to be protected;

a comparing means for comparing said instruction fetch address held in said first address holding means with said instruction fetch address held in said third address holding means only when said access detecting means detects that said read-out instruction is the instruction accessing to said region to be protected, said comparing means outputting an inhibiting signal when said read-out instruction is an instruction read out from a memory address not allowed to access to said region to be protected; and an access inhibiting means responding to said inhibiting signal to inhibit a memory access.

2. A memory access control circuit claimed in claim 1 wherein said inhibiting means includes an instruction decoder receiving said read-out instruction from an instruction register for decoding said read-out instruction and outputting a control signal indicating that said read-out instruction is a memory read instruction when said read-out instruction is the memory read instruction, a gate circuit receiving said control signal to ordinarily supply said control signal to a control circuit, said gate circuit inhibiting supplying of said control signal to said control circuit when said inhibiting signal is outputted, said control circuit outputting a memory read signal when said control circuit receives said control signal through said gate circuit, whereby when said control circuit does not receive said control signal through said gate circuit, said control circuit does not output said memory read signal.

3. A memory access control circuit for inhibiting a fraudulent access by detecting an access to a region to be protected on a memory, the memory access control circuit comprising:
- a first address holding means for holding an instruction fetch address indicating a memory location where an instruction to be executed is stored;
- a second address holding means for holding an address for said region to be protected;
- a third address holding means for holding an instruction fetch address comprising a memory location of an instruction allowed to branch to said region to be protected;
- an access detecting means for comparing an address of a branch destination of an instruction read out from the memory, obtained from the result of a decoding of said read-out instruction, with said address held in said second address holding means, for discriminating whether or not said read-out instruction is an instruction branching to said region to be protected;
- a comparing means for comparing said instruction fetch address held in said first address holding means with said instruction fetch address held in said third address holding means only when said access detecting means detects that said read-out instruction is the instruction branching to said region to be protected, said comparing means outputting an inhibiting signal when said read-out instruction is an instruction read out from a memory address not allowed to branch to said region to be protected; and
- an access inhibiting means responding to said inhibiting signal to inhibit execution of the branch instruction.

4. A memory access control circuit claimed in claim 3 wherein said inhibiting means includes a control circuit responding to said inhibiting signal to generate an internal reset signal.

5. A memory access control circuit claimed in claim 3 wherein said inhibiting means includes an instruction decoder receiving said read-out instruction from an instruction register for decoding said read-out instruction and outputting a control signal indicating that said read-out instruction is a branch instruction when said read-out instruction is the branch instruction, said instruction decoder also receiving said inhibiting signal to mask a control signals for updating the content of a program counter whereby said program counter is incremented as an ordinary non-branching case.

6. A memory access control circuit for inhibiting a fraudulent access by detecting an access to a region to be protected on a memory, the memory access control circuit comprising:
- a first address location for holding an instruction fetch address indicating a memory location where an instruction to be executed is stored;
- a first address table area for holding a set of addresses corresponding to said region to be protected;
- a second address table area for holding a set of instruction fetch addresses comprising memory locations of instructions allowed access to said region to be protected;
- an access detecting means for comparing an address of an access destination of an instruction read out from the memory, obtained from the result of a decoding of said read-out instruction, with said addresses held in said first address table area, for discriminating whether or not said read-out instruction is an instruction for accessing said region to be protected;
- a comparing means for comparing said instruction fetch address held in said first address location with said instruction fetch addresses held in said second address table area only when said access detecting means detects that said read-out instruction in an instruction accessing said region to be protected, said comparing means outputting an inhibiting signal when said read-out instruction is an instruction read out from a memory address not allowed access to said region to be protected; and
- an access inhibiting means responding to said inhibiting signal to inhibit a memory access.

* * * * *